(12) United States Patent
Prakash et al.

(10) Patent No.: US 11,357,063 B2
(45) Date of Patent: Jun. 7, 2022

(54) PHYSICAL CELL IDENTIFIER COLLISION DETECTION

(71) Applicant: CommScope Technologies LLC, Hickory, NC (US)

(72) Inventors: Shiva Prakash, Bengaluru (IN); Nandish Chalishazar, Nashua, NH (US); Devulapalli Venkata Surya Narayana Murthy, Bangalore (IN)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/019,792

(22) Filed: Sep. 14, 2020

(65) Prior Publication Data

US 2021/0084698 A1 Mar. 18, 2021

Related U.S. Application Data

(60) Provisional application No. 62/983,106, filed on Feb. 28, 2020, provisional application No. 62/927,270, filed on Oct. 29, 2019.

(30) Foreign Application Priority Data

Sep. 14, 2019 (IN) .............................. 201931037071

(51) Int. Cl.
*H04W 76/11* (2018.01)
*H04W 48/16* (2009.01)
(Continued)

(52) U.S. Cl.
CPC ............ *H04W 76/11* (2018.02); *H04W 48/16* (2013.01); *H04W 76/19* (2018.02); *H04W 76/27* (2018.02)

(58) Field of Classification Search
CPC ..... H04W 76/00; H04W 76/10; H04W 76/11; H04W 76/18; H04W 76/19; H04W 76/20; H04W 76/27; H04W 76/30; H04W 48/16
See application file for complete search history.

(56) References Cited

U.S. PATENT DOCUMENTS

| | | | |
|---|---|---|---|
| 2010/0297955 A1* | 11/2010 | Marinier | H04W 36/0061 455/73 |
| 2012/0009957 A1* | 1/2012 | Murasawa | H04W 8/26 455/507 |

(Continued)

FOREIGN PATENT DOCUMENTS

JP        2012529842 A        11/2012

OTHER PUBLICATIONS

Intel Corporation, "Consideration of PCI confusion", 3GPP TSG-RAN WG2 meeting #104, Nov. 2018, pp. 1 through 3.
(Continued)

*Primary Examiner* — Jean A Gelin
(74) *Attorney, Agent, or Firm* — Fogg & Powers LLC

(57) ABSTRACT

A base station for performing physical cell identifier (PCI) collision detection. The base station includes at least one processor configured to determine whether a PCI in a radio resource control (RRC) re-establishment message is the same as a PCI used by a cell implemented by the base station. The at least one processor is also configured to determine whether a cell radio network temporary identifier (C-RNTI) in the RRC Re-establishment message is outside a reserved range of C-RNTIs for the cell. The at least one processor is also configured to identify a possible PCI collision for the cell when (1) the PCI in the RRC Re-establishment message is the same as a PCI used by the cell; and (2) the C-RNTI in the RRC Re-establishment message is outside the reserved range of C-RNTIs for the cell.

24 Claims, 6 Drawing Sheets

(51) Int. Cl.
*H04W 76/19* (2018.01)
*H04W 76/27* (2018.01)

(56) References Cited

U.S. PATENT DOCUMENTS

| | | | |
|---|---|---|---|
| 2014/0087735 A1* | 3/2014 | Vikberg | H04W 36/0058 455/436 |
| 2014/0274029 A1 | 9/2014 | Radulsecu et al. | |
| 2014/0335872 A1* | 11/2014 | Yamada | H04W 76/15 455/450 |
| 2014/0376462 A1* | 12/2014 | Kim | H04W 74/0808 370/329 |
| 2015/0065112 A1* | 3/2015 | Lee | H04W 24/02 455/418 |
| 2016/0073304 A1* | 3/2016 | Dahlen | H04W 48/08 455/437 |
| 2016/0088516 A1 | 3/2016 | Radulescu et al. | |
| 2016/0242152 A1* | 8/2016 | Yu | H04W 76/14 |
| 2016/0255552 A1* | 9/2016 | Uchino | H04B 7/024 370/329 |
| 2017/0238243 A1* | 8/2017 | Park | H04W 48/16 455/434 |
| 2017/0359737 A1 | 12/2017 | Singh et al. | |
| 2018/0317218 A1* | 11/2018 | Li | H04W 68/02 |
| 2019/0007870 A1 | 1/2019 | Gupta et al. | |
| 2019/0342804 A1* | 11/2019 | Futaki | H04W 36/14 |
| 2021/0045170 A1* | 2/2021 | Luo | H04W 36/06 |
| 2021/0059015 A1* | 2/2021 | Luo | H04W 72/0466 |
| 2021/0250822 A1* | 8/2021 | Mishra | H04W 36/0061 |

OTHER PUBLICATIONS

International Searching Authority, "International Search Report and Written Opinion from PCT Application No. PCT/US2020/050652", from Foreign Counterpart to U.S. Appl. No. 17/019,792, filed Dec. 28, 2020, pp. 1 through 10, Published: WO-.

\* cited by examiner

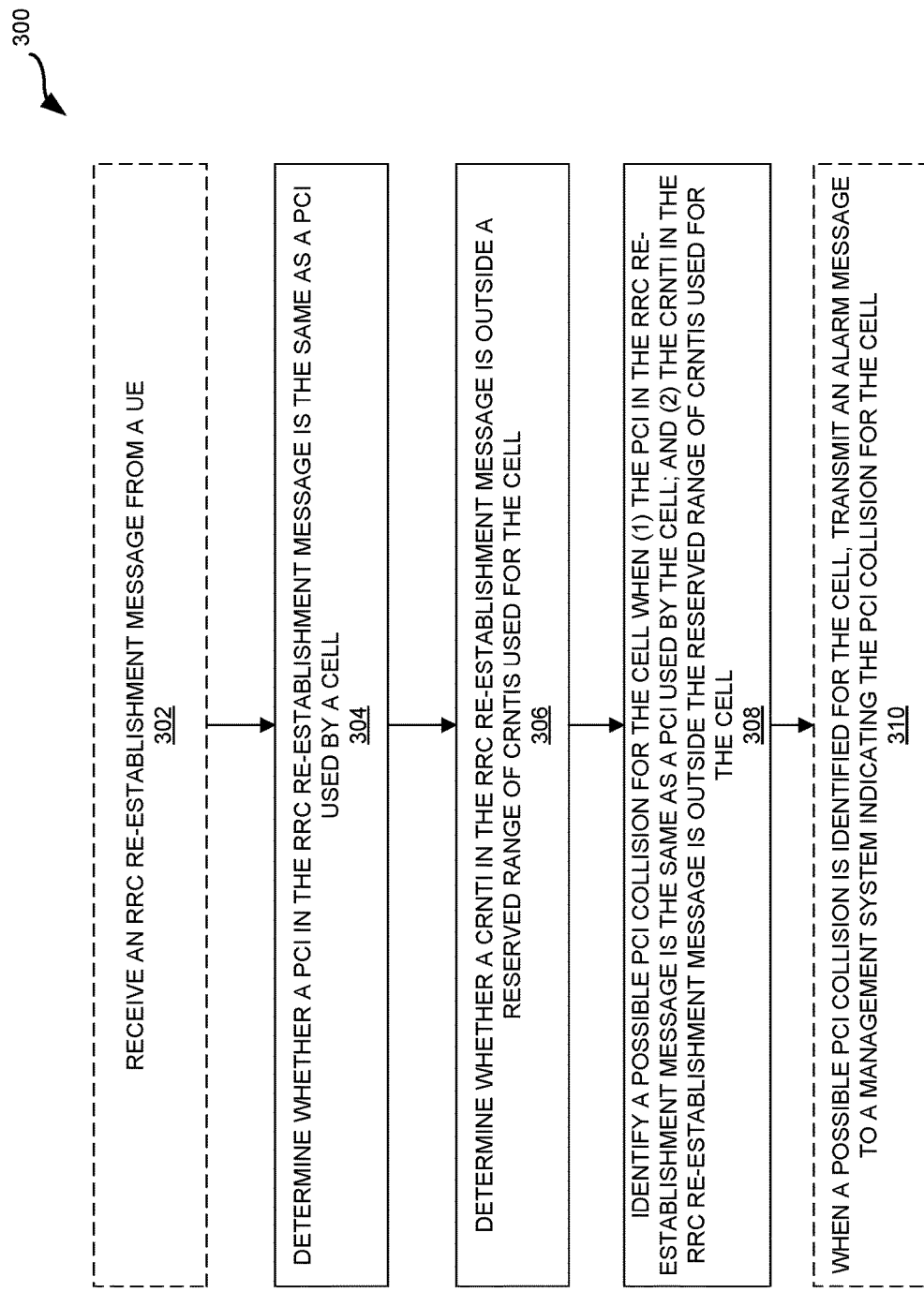

PHYSICAL CELL IDENTIFIER COLLISION DETECTION

CROSS-REFERENCE TO RELATED APPLICATIONS

This application claims the benefit of:
Indian Provisional Application No. 201931037071 filed on Sep. 14, 2019, entitled "PHYSICAL CELL IDENTIFIER COLLISION DETECTION";
U.S. Provisional Patent Application Ser. No. 62/927,270 filed on Oct. 29, 2019, entitled "PHYSICAL CELL IDENTIFIER COLLISION DETECTION"; and
U.S. Provisional Patent Application Ser. No. 62/983,106 filed on Feb. 28, 2020, entitled "PHYSICAL CELL IDENTIFIER COLLISION DETECTION", all of which are incorporated herein by reference in their entireties.

BACKGROUND

A physical cell identifier (PCI) may be selected or assigned for each cell/sector implemented by a base station. Accordingly, it may be beneficial to detect PCI collisions.

SUMMARY

A base station for performing physical cell identifier (PCI) collision detection. The base station includes at least one processor configured to determine whether a PCI in a radio resource control (RRC) re-establishment message is the same as a PCI used by a cell implemented by the base station. The at least one processor is also configured to determine whether a cell radio network temporary identifier (C-RNTI) in the RRC Re-establishment message is outside a reserved range of C-RNTIs for the cell. The at least one processor is also configured to identify a possible PCI collision for the cell when (1) the PCI in the RRC Re-establishment message is the same as a PCI used by the cell; and (2) the C-RNTI in the RRC Re-establishment message is outside the reserved range of C-RNTIs for the cell.

DRAWINGS

Understanding that the drawings depict only exemplary configurations and are not therefore to be considered limiting in scope, the exemplary configurations will be described with additional specificity and detail through the use of the accompanying drawings, in which.

Figure 2A:
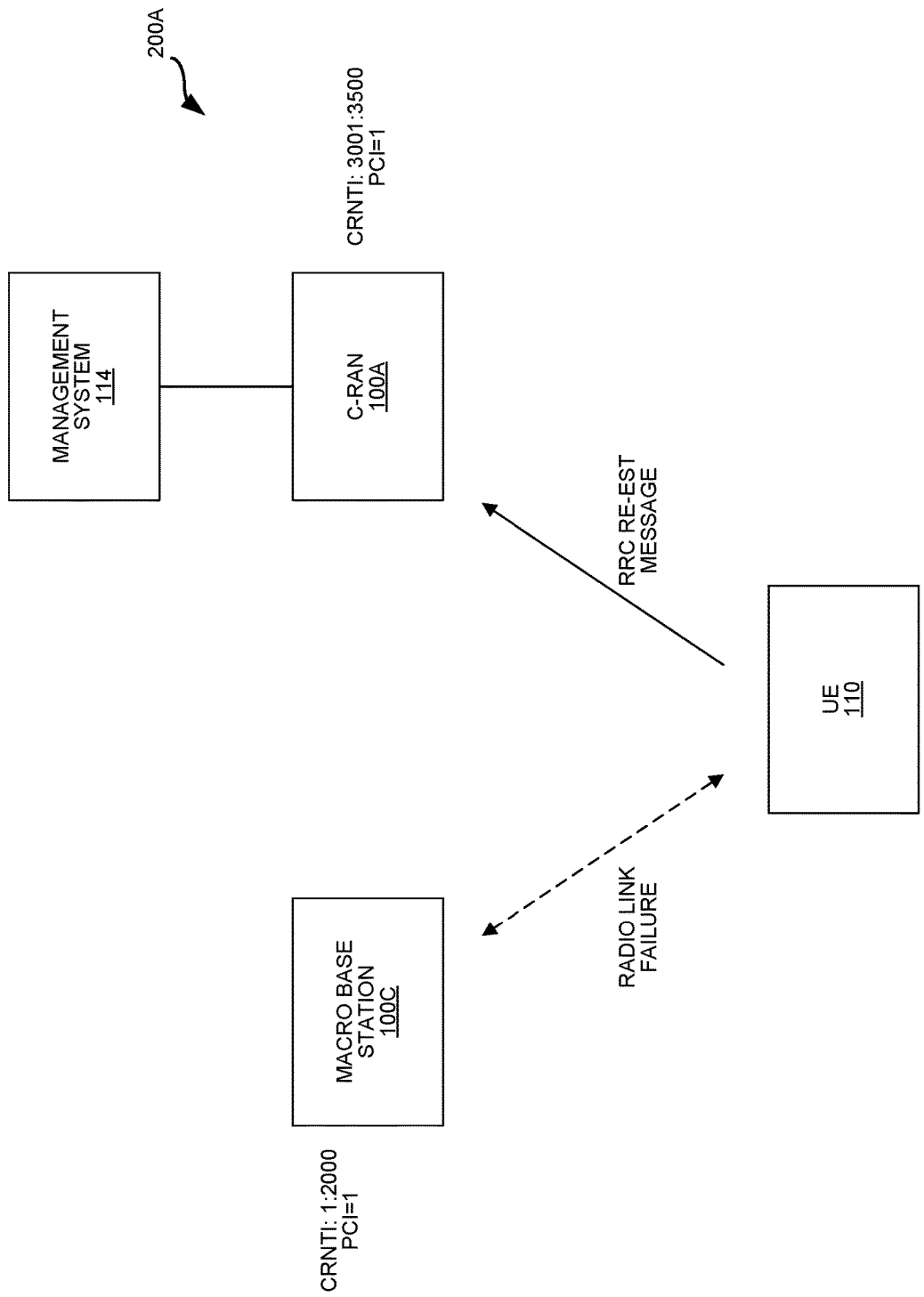
Figure 2B:
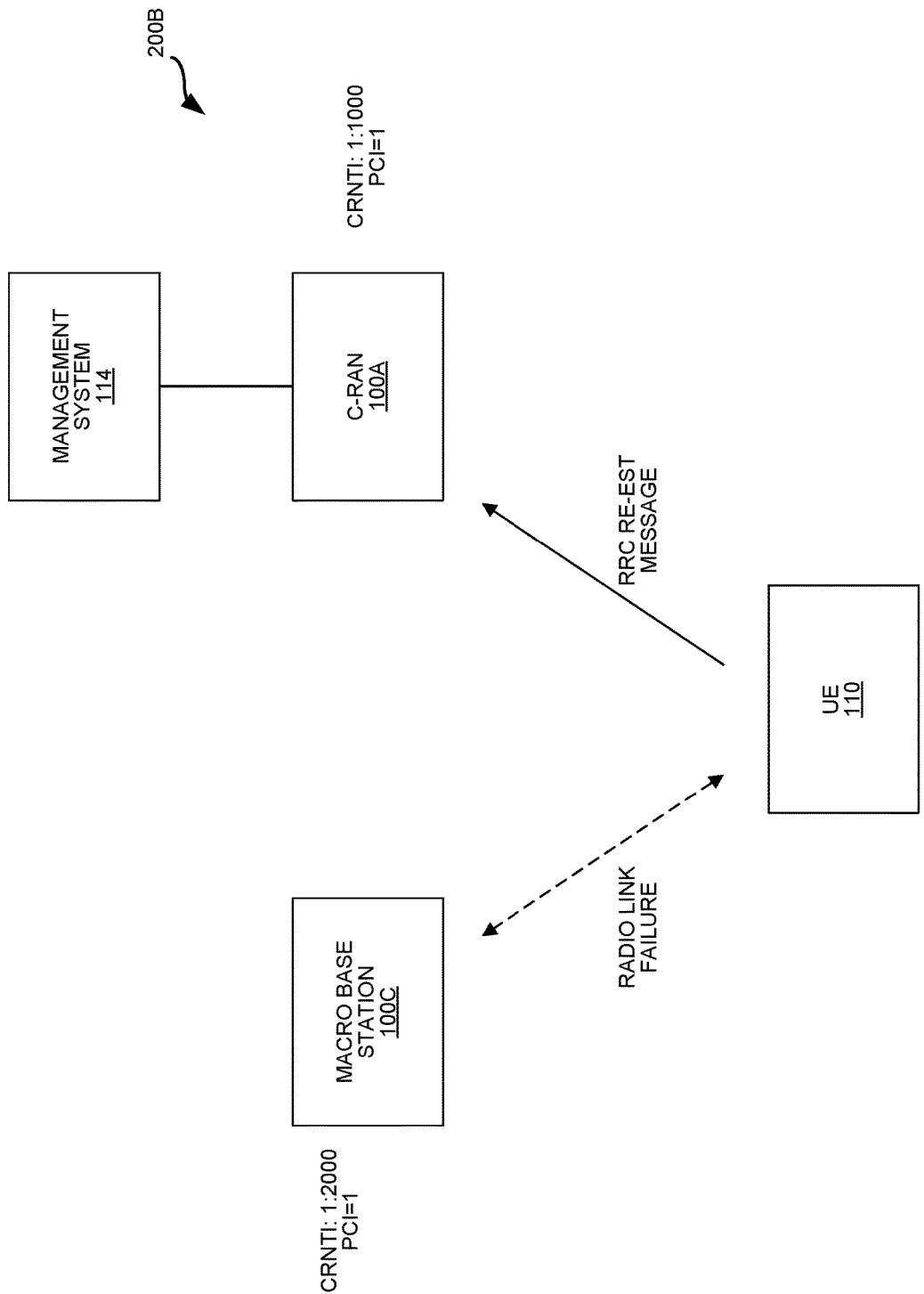

FIGS. 2A-B are block diagrams illustrating example collision detection scenarios in non-overlapping (FIG. 2A) and partially overlapping (FIG. 2B) C-RNTI range cases;

FIG. 3 is a flow diagram illustrating a method for PCI collision detection; and

Figure 4:
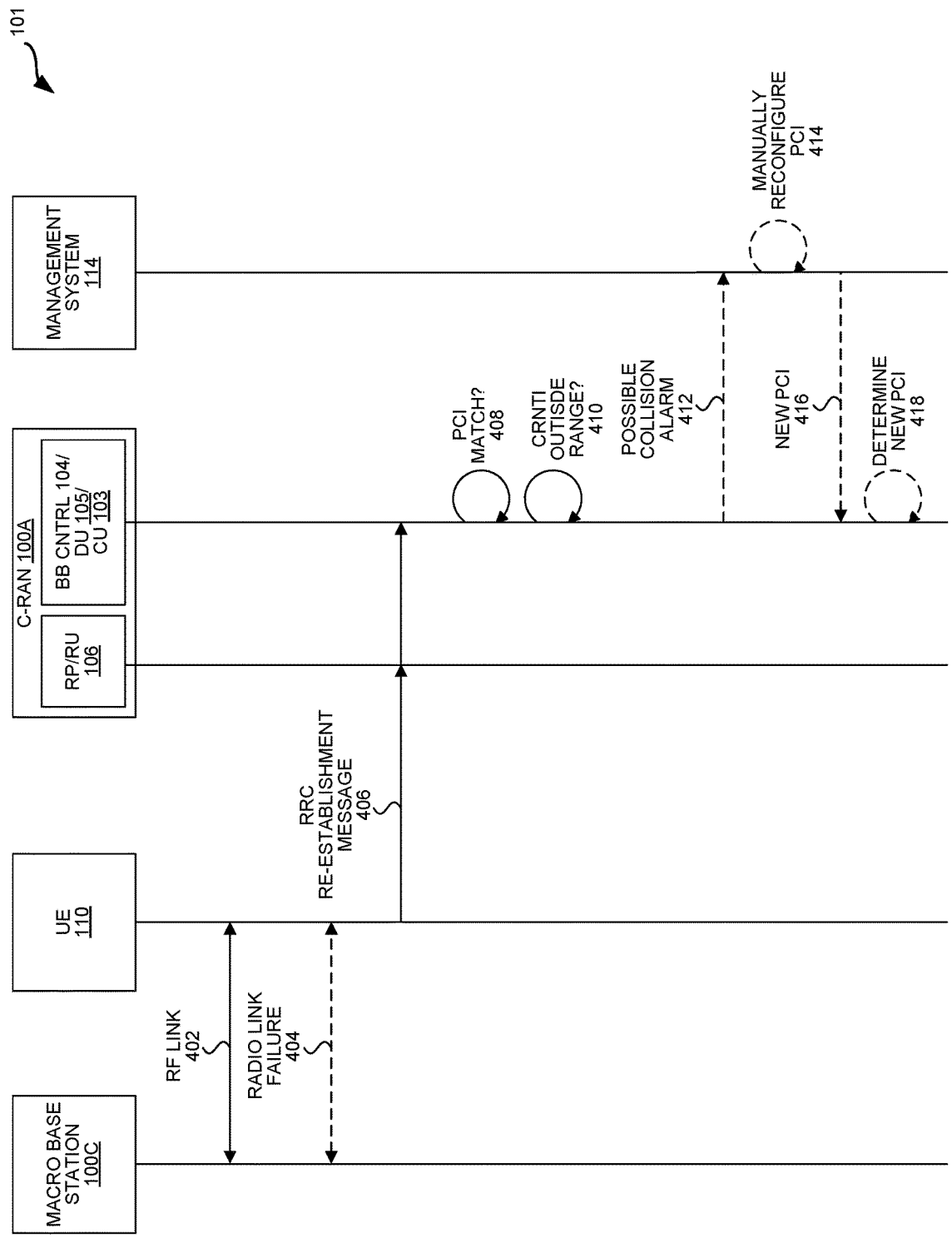

FIG. 4 is a sequence diagram illustrating PCI collision detection in a communication system.

In accordance with common practice, the various described features are not drawn to scale but are drawn to emphasize specific features relevant to the exemplary configurations.

DETAILED DESCRIPTION

PCI planning affects the performance of a wireless system because a direct PCI collision results in interference and degrades system performance. As the number of PCIs are limited, reuse of PCIs is inevitable, and might result in neighboring base stations sharing the same PCI. Thus, an incorrect assignment might result in two neighboring cells on the same operating frequency having the same PCI (referred to as a "PCI collision"), which degrades neighbor detection and impacts mobility.

To avoid these problems, a PCI collision detection mechanism may be used, which enables a wireless system (e.g., base station) to reconfigure its PCI(s) by itself and/or alert the management system of the collision. Although it is possible to detect PCI collisions via inter-base-station communication (such as X2 AP), these interfaces might not be viable in a dense environment where macro base stations and small cells co-exist. In such cases, new PCI collision detection mechanisms are desired. The present systems and methods describe a PCI collision detection mechanism for a base station (e.g., C-RAN, macro base station, small cell, etc.) in the absence of base-station-to-base-station communication, such as the X2 interface.

According to the present systems and methods, a possible PCI collision is declared for a cell when a cell radio network temporary identifier (C-RNTI) in an RRC Re-establishment message (received at the cell from a UE) doesn't match (doesn't fall in) the range of operating C-RNTIs of the cell (meaning that the UE came in from another neighboring cell) and when the PCI in the RRC Re-establishment message is the same as the cell's PCI in use. In some configurations, when declaring a possible PCI collision, an alert indicating the possible PCI collision is sent to a management system (e.g., a HeMS/DMS).

Example 4G System

Figure 1A:
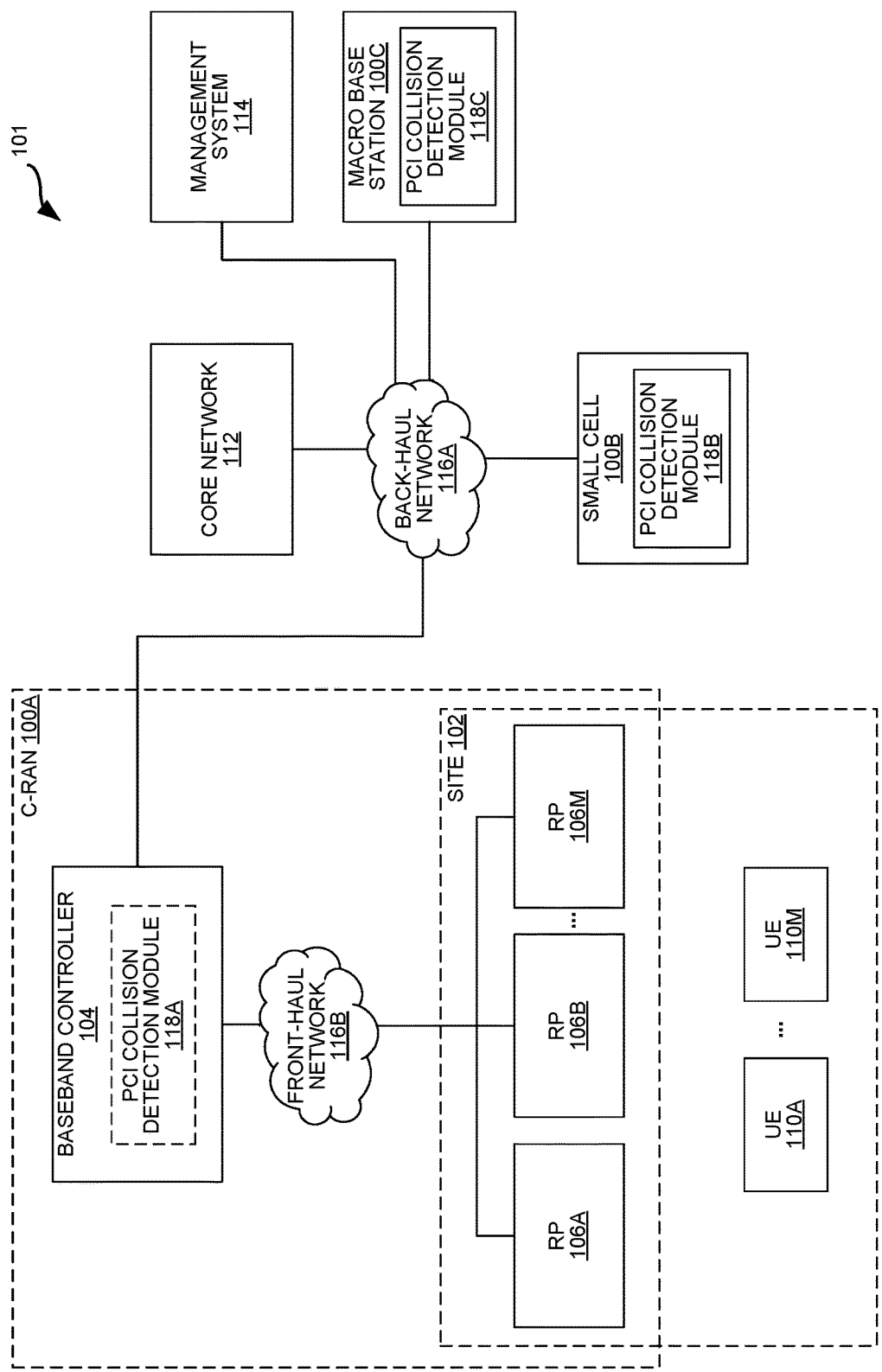
FIG. 1A is a block diagram illustrating an exemplary configuration of a system, implementing physical cell identifier (PCI) collision detection, which includes 3GPP Fourth Generation (4G) components.

FIG. 1A is a block diagram illustrating an exemplary configuration of a system 101, implementing physical cell identifier (PCI) collision detection, which includes 3GPP Fourth Generation (4G) components. The term base station 100 herein refers to any electronic device configured to receive and transmit RF signals in order to provide wireless service to user equipment (UEs) 110A-M. Typically, base stations 100 are in a fixed location, however other configurations are possible. Without limitation, types of base stations include a cloud radio access network (C-RAN) 100A, a small cell 100B, a macro base station 100C, etc. Small cells 100B are generally lower-power, shorter-range, and can serve fewer max concurrent users than macro base stations 100C. For example, small cell(s) 100B may be used to fill in coverage gaps in macro base station 100C coverage, e.g., indoors, in urban environments, etc. In some cases, a C-RAN 100A may be considered a type of small cell 100B.

In LTE, a base station 100 may be referred to as an "eNodeB", although the present systems and methods can alternatively or additionally be used with systems implementing 3G and/or 5G air interfaces. It is understood that the system 101 can include any number and type of base stations 100.

In the exemplary configuration shown in FIG. 1A, the C-RAN 100A may utilize a point-to-multipoint distributed base station architecture that employs at least one (and optionally multiple) baseband unit 104 and multiple radio points (RPs) 106A-M that serve at least one cell. The C-RAN 100A may also be referred to herein as a "C-RAN system," an "eNodeB," and/or a "base station." The baseband unit 104 is also referred to herein as a "baseband controller" 104, just a "controller" 104, or "CU" 104. Each RP 106 may include or be coupled to at least one antennas via which downlink RF signals are radiated to UEs 110A-M and via which uplink RF signals transmitted by UEs 110 are received. Furthermore, where an action is described as being performed by a C-RAN 100A, it may be performed in the baseband controller 104 and/or at least one RP 106.

The RPs 106 and UEs 110 connected to (e.g., provided wireless service by) the C-RAN 100A may be located at a site 102. The site 102 may be, for example, a building or campus or other grouping of buildings (used, for example, by one or more businesses, governments, other enterprise entities) or some other public venue (such as a hotel, resort, amusement park, hospital, shopping center, airport, university campus, arena, or an outdoor area such as a ski area, stadium or a densely-populated downtown area). For example, the site 102 may be at least partially indoors, but other alternatives are possible.

It should be noted that the baseband controller 104 may or may not be located at the site 102 (with the RPs 106). For example, the baseband controller 104 may be physically located remotely from the RPs 106 (and the site 102) in a centralized bank of baseband controllers 104. Additionally, the RPs 106 are preferably physically separated from each other within the site 102, although they are each communicatively coupled to the baseband controller 104.

Each UE 110 may be a computing device with at least one processor that executes instructions stored in memory, e.g., a mobile phone, tablet computer, mobile media device, mobile gaming device, laptop computer, vehicle-based computer, a desktop computer, etc. It should be noted that any number of UEs 110 (e.g., M=1-1,000) may be present at the site 102.

The C-RAN 100A may be coupled to the core network 112 of each wireless network operator over an appropriate back-haul network 116A. For example, the Internet (or any other ETHERNET network) may be used for back-haul between each base station 100 and each core network 112. However, it is to be understood that the back-haul network 116A can be implemented in other ways.

In some configurations, the system 101 may be implemented as a Long Term Evolution (LTE) radio access network providing wireless service using an LTE air interface. However, it should be noted that the present systems and methods may be used with other wireless protocols, e.g., 2G, 3G, 4G, 5G. LTE is a 4G standard defined by 3GPP standards organization. In the LTE configuration, the baseband controller 104 and RPs 106 together (C-RAN 100A) may be used to implement an LTE Evolved Node B (also referred to here as an "eNodeB" or "eNB"). An eNodeB may be used to provide UEs 110 with mobile access to the wireless network operator's core network 112 to enable UE 110 to wirelessly communicate data and voice (using, for example, Voice over LTE (VoLTE) technology).

Also, in an exemplary LTE configuration, each core network 112 may be implemented as an Evolved Packet Core (EPC) 112 comprising standard LTE EPC network elements such as, for example, a mobility management entity (MME) and a Serving Gateway (SGW) and, optionally, a Home eNodeB gateway (HeNodeB GW) (not shown) and a Security Gateway (SeGW) (not shown).

Moreover, in an exemplary LTE configuration, the baseband controller 104 may communicate with the MME and SGW in the EPC core network 112 using the LTE S1 interface and communicates with eNodeBs using the LTE X2 interface. For example, the baseband controller 104 can communicate with a macro base station 100C via the LTE X2 interface.

The baseband controller 104 and radio points 106 can be implemented so as to use an air interface that supports one or more of frequency-division duplexing (FDD) and/or time-division duplexing (TDD). Also, the baseband controller 104 and the radio points 106 can be implemented to use an air interface that supports one or more of the multiple-input-multiple-output (MIMO), single-input-single-output (SISO), and/or beam forming schemes. For example, the baseband controller 104 and the radio points 106 can implement one or more of the LTE transmission modes. Moreover, the baseband controller 104 and the radio points 106 can be configured to support multiple air interfaces and/or to support multiple wireless operators.

In some configurations, the front-haul network 116B that communicatively couples each baseband controller 104 to the one or more RPs 106 is implemented using a standard ETHERNET network. However, it is to be understood that the front-haul network 116B between the baseband controller 104 and RPs 106 can be implemented in other ways. The front-haul network 116B may be implemented with one or more switches, routers, and/or other networking devices.

Data can be front-hauled between the baseband controller 104 and RPs 106 in any suitable way (for example, using front-haul interfaces and techniques specified in the Common Public Radio Interface (CPRI) and/or Open Base Station Architecture Initiative (OBSAI) family of specifications).

The Third Generation Partnership Project (3GPP) has adopted a layered model for the LTE radio access interface. Generally, the baseband controller 104 and/or RPs 106 perform analog radio frequency (RF) functions for the air interface as well as digital Layer-1 (L1), Layer-2 (L2), and/or Layer-3 (L3), of the 3GPP-defined LTE radio access interface protocol, functions for the air interface. In some configurations, the Layer-1 processing for the air interface may be split between the baseband controller 104 and the RPs 106, e.g., with L2-L3 functions for the air interface being performed at the baseband controller 104.

A management system 114 may be communicatively coupled to the baseband controller 104 and RPs 106, for example, via the back-haul network 116A and the front-haul network 116B (in the case of the RPs 106). In some configurations, the management system 114 is a home eNodeB management system (HeMS) and/or a device management system (DMS). The management system 114 may send and receive management communications to and from the baseband controller 104, which in turn forwards relevant management communications to and from the RPs 106. Additionally, the management system 114 may assist in managing and/or configuring the base stations 100. For example, an operator may provide user input to the management system 114 to reconfigure one or more PCIs in a system 101.

A base station 100 can implement one or more cells (or sectors). Each cell (or sector) implemented by a base station 100 may be associated with a physical cell identifier (PCI). The PCI for a cell may be assigned to or selected by the base station 100 implementing the cell. In a C-RAN 100A, the PCI may be assigned to the baseband controller 104 (that maps to a particular cell).

A set of cell radio network temporary identifiers (C-RNTIs) is reserved for use in a cell, based on the maximum user connection capacity, e.g., the number of UEs 110 that can connect to the cell. A C-RNTI is an identifier, unique within a cell, assigned to a UE 110 while it is in the cell, e.g., a UE 110 is assigned a new C-RNTI when entering/attaching to a new cell. Ideally, different base stations 100 in proximity to each other would have different, non-overlapping ranges of C-RNTIs reserved. However, in some configurations, the reserved ranges for different base stations 100 (in proximity to each other) at least partially overlap. In some configurations, the maximum user/UE 110 capacity for a C-RAN 100A is 500 or 1000 users/UEs 110 per cell, hence it is beneficial to choose an unlikely range of C-RNTIs for use given that the C-RNTI values can range from 1 to 65523. It should be noted that that choosing non-overlapping C-RNTI ranges for different cells may increase the chances of collision detection with neighbors.

Each base station 100 may include a PCI collision detection module 118 configured to detect PCI collisions with nearby base stations 100. If the base station 100 is a C-RAN 100A, the PCI collision detection module 118 may be implemented in the baseband controller 104. The PCI collision detection module 118 may be implemented using at least one processor executing instructions stored in at least one memory.

Each PCI collision detection module 118 analyzes radio resource control (RRC) Re-establishment messages to identify PCI collisions with neighboring cells. RRC Re-establishment messages are sent by UEs 110 (towards a target cell), soon after undergoing and detecting a radio link failure (RLF) on a serving cell, in order to reestablish its connection. Each RRC Re-establishment message includes a PCI and a C-RNTI, among other fields. Upon receiving an RRC Re-establishment message at a base station 100, the PCI collision detection module 118 may detect a possible collision for a cell (implemented by the base station 100) in response to determining that: (1) the PCI in the RRC Re-establishment message is the same as the PCI used by the cell; and (2) the C-RNTI in the RRC Re-establishment message is outside the reserved range of C-RNTIs for the cell implemented by the base station 100. If (1) and (2) are true, then an alarm message is transmitted towards the management system 114 (e.g., HeMS and/or DMS) indicating a possible PCI collision in the system 101. It is likely that in a PCI collision scenario, UEs 110 undergo RLF frequently due to interference, leading to more re-establishments (and RRC Re-establishment messages), thus benefitting the mechanism for early detection of PCI collision.

It should be noted that a PCI collision is defined as co-channel neighboring cells operating with the same PCI. Since the RRC re-establishment message doesn't indicate the neighbor's operating frequency, there can be instances when the neighbor cell uses the same PCI but is operating on a different frequency. These cases are not actual PCI collision scenarios (though they may be possible collisions). Hence the usage of the term "possible". In some configurations, the alarm message to the management system 114 (e.g., HeMS) serves as an indication that there could be a possible collision. Once the alarm is alerted to the management system 114 (e.g., HeMS), the operator can take steps to manually reconfigure a new PCI for the cell. Furthermore, if PCI reconfiguration is allowed in the BC 104 (for 4G) or DU 105 or CU 103 (for 5G), then the BC 104, DU 105, or CU 103 can itself reconfigure the PCI (from a provisioned PCI list) after it has alerted the management system 114 (e.g., HeMS) about the possible PCI collision. In some configurations, this process (at the BC 104, DU 105, or CU 103) is automatic.

Conventional solutions for detecting/identifying PCI collisions may determine whether the C-RNTI is currently allocated by the cell (instead of determining whether the C-RNTI is inside or outside of the range of C-RNTIs reserved for the cell). However, determining whether the C-RNTI is outside of the range of C-RNTIs reserved for the cell has advantages over the conventional solutions because it decreases the likelihood of false PCI collision detection.

In a conventional solution example (where the PCI collision detection relies on whether the C-RNTI is allocated by the cell), a UE 110 returning back to the same cell (after being away/detaching for some period of time) will transmit an RRC re-establishment message with the same PCI as the cell, but potentially a C-RNTI that is not in use by the cell at that point in time, e.g., because the cell has lost context of the UE 110 so it doesn't remember the C-RNTI which it had assigned to the UE 110 earlier. Accordingly, the cell would mistakenly declare a PCI collision in this conventional solution example. In contrast, a PCI collision would not be detected using the present systems and methods because the C-RNTI would still be inside the range of C-RNTIs reserved for the cell (even if it is not currently in use).

Example 5G System

Figure 1B:
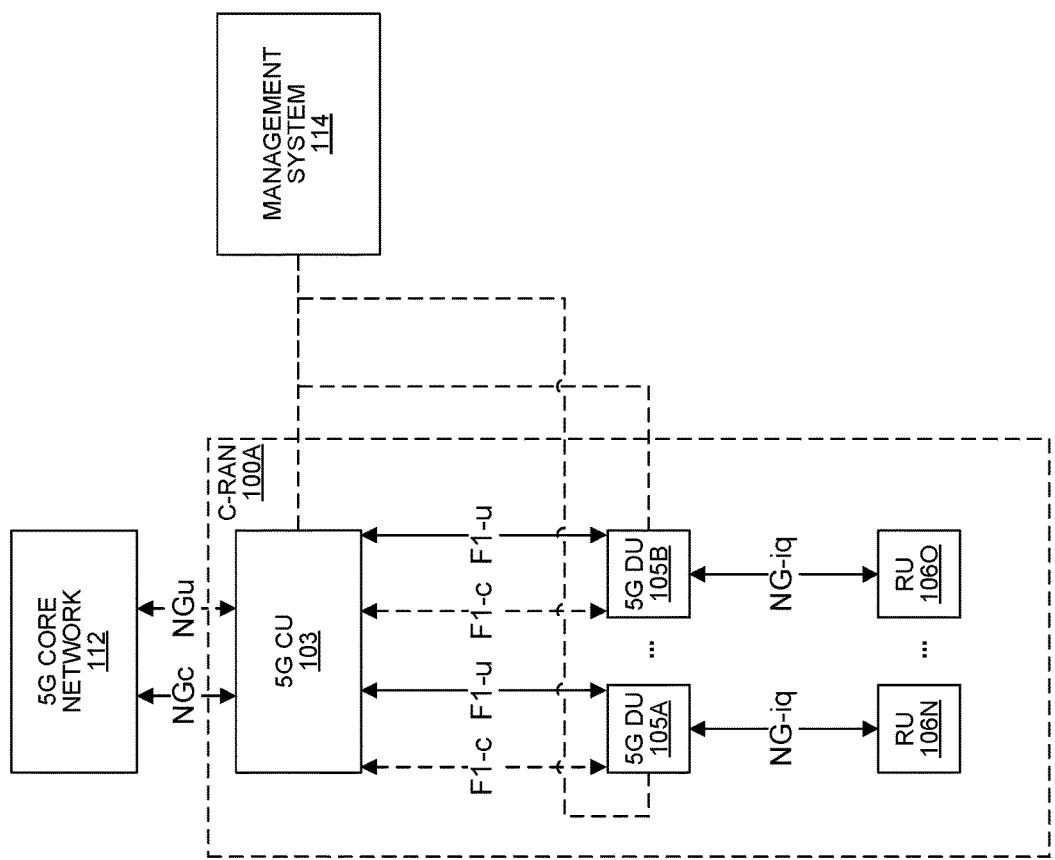
FIG. 1B is a block diagram illustrating an exemplary configuration of a system, implementing physical cell identifier (PCI) collision detection, which includes 3GPP Fifth Generation (5G) components.

FIG. 1B is a block diagram illustrating an exemplary configuration of a system 100A that includes 3GPP Fifth Generation (5G) components. Optionally, the system 100A may additionally include 4G components. Each of the components may be implemented using at least one processor executing instructions stored in at least one memory. In some configurations, at least some of the components are implemented using a virtual machine.

Fifth Generation (5G) standards support a wide variety of applications, bandwidth, and latencies while supporting various implementation options. In the system 100, interfaces denoted with "-c" or simply "c" (illustrated with dashed lines) provide control plane connectivity, while interfaces denoted with "-u" or simply "u" (illustrated with solid lines) provide user plane connectivity.

FIG. 1B illustrates a C-RAN 100A implementing an example of a 5G Next Generation NodeB (gNB). The architecture of a Next Generation NodeB (gNB) is partitioned into a 5G Central Unit (CU) 103, one or more 5G Distributed Unit (DU) 105A-B and one or more 5G Remote Units (RU) 106N-O. A 5G Central Unit (CU) 103 is a node that includes the gNB controller functions such as the transfer of user data, mobility control, radio access network sharing, positioning, session management, etc. The 5G CU 103 controls the operation of the Distributed Units (DUs) 105A-B over an interface (including F1-c and F1-u for the control plane and user plane, respectively).

The Distributed Units (DUs) 105 may be nodes that implement a subset of the gNB functions, depending on the functional split (between CU 103 and DU 105). In some configurations, the L3 processing (of the 5G air interface) may be implemented in the CU 103 and the L2 processing (of the 5G air interface) may be implemented in the DU 105. The operation of each DU 105 is controlled by a CU 103. The functions of the DU 105 may include Radio Link Control (RLC), portions of Medium Access Control (MAC) and/or portions of the physical (PHY) layer functions. A Distributed Unit (DU) 105 can optionally offload some of its PHY (L1) processing (of the 5G air interface) to RUs 106.

In FIG. 1B, the C-RAN 100A implementing the example Next Generation NodeB (gNB) includes a single CU 103, which handles control plane functions and user plane functions. The 5G CU 103 (in the C-RAN 100A) may communicate with at least one wireless service provider's Next Generation Cores (NGC) 112 using 5G NGc and 5G NGu interfaces. In some 5G configurations (not shown), a 5G CU is split between a CU-C 103B that handles control plane functions and a CU-U 103C that handles user plane functions.

In some 5G configurations, the RUs (RUs) 106N-0 may communicate baseband signal data to the DUs 105 on an NG-iq interface. In some 5G configurations, the RUs 106 may implement at least some of the L1 and/or L2 processing. In some configurations, the RUs 106 may have multiple ETHERNET ports and can communicate with multiple switches.

Any of the interfaces in FIG. 1B may be implemented using a switched ETHERNET (or fiber) network. Additionally, if multiple CUs 103 are present (not shown), they may communicate with each other using any suitable interface, e.g., an Xn (Xn-c and Xn-u) and/or X2 interface. A fronthaul interface (not shown in FIG. 1B) may facilitate any of the NG-iq, F1-c, and/or F1-u interfaces in FIG. 1B.

Additionally, a management system 114 may be communicatively coupled to the CU 103 and/or the DU(s) 105. The management system 114 may send and receive management communications to and from the CU 103 and/or the DU(s) 105, which in turn forwards relevant management communications to and from the RUs 106. Additionally, the management system 114 may assist in managing and/or configuring the C-RAN 100A, e.g., an operator may provide user input to the management system 114 to reconfigure one or more PCIs.

In some configurations, the CU 103 and/or DU(s) 105 may include a PCI collision detection module 118 configured to detect PCI collisions with nearby base stations 100, as described herein. The PCI collision detection module 118 may be implemented using at least one processor executing instructions stored in at least one memory in the CU 103 and/or DU(s) 105.

Although not illustrated in FIG. 1B, the 5G C-RAN 100A may operate in a wireless system with any number of other C-RANs (4G and/or 5G), macro base stations 100C, and/or small cells 100B, which may also access one or more core networks 112.

PCI Collision Detection

FIGS. 2A-B are block diagrams illustrating example collision detection scenarios 200A-B in non-overlapping (FIG. 2A) and partially overlapping (FIG. 2B) C-RNTI range cases. FIGS. 2A-B are illustrated with a UE 110 that has recently undergone radio link failure (RLF) on a serving macro base station 100C, after which the UE 110 sends an RRC Re-establishment message that is received by a C-RAN 100A, where both the macro base station 100C and the C-RAN 100A operate with the same PCI=1. However, it is understood that each of the different base stations 100 in FIGS. 2A-B may be any type, e.g., C-RAN 100A, small cell 100B, and/or macro base station 100C. It is assumed that the macro base station 100C and the C-RAN 100A in FIGS. 2A-B are in relatively close proximity to each other, such that RF signals transmitted by the UE 110 could be received by either or both base stations 100. Furthermore, assume that each of the macro base station 100C and the C-RAN 100A in FIGS. 2A-B implement a single cell on the same frequency (F1).

In the example scenario 200A of FIG. 2A, the macro base station 100C and the C-RAN 100A have reserved C-RNTI ranges that do not overlap with each other. Specifically, the macro base station 100C has a C-RNTI range from 1-2000, while the C-RAN 100A has a C-RNTI range from 3001-3500. In other words, UEs 110 served by the macro base station 100C are assigned a C-RNTI with a value from 1-2000, while UEs 110 served by the C-RAN 100A are assigned a C-RNTI with a value from 3001-3500.

In the example scenario 200A of FIG. 2A, the UE 110 is served by the macro base station 100C (during which it is assigned a C-RNTI=800), after which the UE 110 experiences radio link failure. Following RLF, the UE 110 transmits an RRC Re-establishment message with PCI=1 and C-RNTI=800. The RRC Re-establishment message is received at the C-RAN 100A (e.g., received at an RP/RU 106, then transmitted to the baseband controller 104, DU 105, or CU 103 of the C-RAN 100A) whose PCI=1 and C-RNTI range is 3001-3500. A PCI collision module 118 (e.g., in the baseband controller 104, DU 105, or CU 103 of the C-RAN 100A) may analyze the contents of the RRC Re-establishment message to detect whether a possible PCI collision with the neighbor (the macro base station 100C in this example) exists. In this scenario 200A, a possible PCI collision is detected because (1) the received PCI is same as that of the C-RAN 100A, i.e., "1"; and (2) the received C-RNTI=800 is outside of the C-RNTI range of the C-RAN 100A (e.g., the baseband controller 104, DU 105, or CU 103 of the C-RAN 100A) of 3001-3500. Accordingly, a possible PCI collision alarm is raised towards the management system 114, after which (1) the operator can take steps to manually reconfigure a new PCI for the cell, or (2) the BC 104 (for 4G) or DU 105 or CU 103 (for 5G) reconfigures the PCI for its cell (e.g., by selecting a new PCI from a provisioned PCI list) after notifying the management system 114.

In the example scenario 200B of FIG. 2B, the macro base station 100C and the C-RAN 100A have reserved C-RNTI ranges that partially overlap with each other. Specifically, the macro base station 100C has a C-RNTI range from 1-2000, while the C-RAN 100A has a C-RNTI range from 1-1000. In other words, UEs 110 served by the macro base station 100C are assigned a C-RNTI with a value from 1-2000, while UEs 110 served by the C-RAN 100A are assigned a C-RNTI with a value from 1-1000.

In the example scenario 200B of FIG. 2B, the UE 110 is served by the macro base station 100C (during which it is assigned a C-RNTI=1500), after which the UE 110 experiences radio link failure. Following RLF, the UE 110 transmits an RRC Re-establishment message with PCI=1 and C-RNTI=1500. The RRC Re-establishment message is received at the C-RAN 100A (e.g., received at an RP/RU 106, then transmitted to the baseband controller 104, DU 105, or CU 103 of the C-RAN 100A) whose PCI=1 and C-RNTI range is 1-1000. A PCI collision module 118 (e.g., in the baseband controller 104, DU 105, or CU 103 of the C-RAN 100A) may analyze the contents of the RRC Re-establishment message to detect whether a possible PCI collision with the neighbor (the macro base station 100C in this example) exists. In this scenario 200B, a possible PCI collision is detected because (1) the received PCI is same as that of the C-RAN 100A, i.e., "1"; and (2) the received C-RNTI=1500 is outside of the C-RNTI range of the C-RAN 100A (e.g., the baseband controller 104, DU 105, or CU 103 of the C-RAN 100A) of 1-1000. Accordingly, a possible PCI collision alarm is raised towards the management system 114, after which (1) the operator can take steps to manually reconfigure a new PCI for the cell, or (2) the BC 104 (for 4G) or DU 105 or CU 103 (for 5G) select a new PCI for its cell (from a provisioned PCI list) after notifying the management system 114.

FIG. 3 is a flow diagram illustrating a method 300 for PCI collision detection. The method 300 may be performed by at least one processor in a base station 100. The base station 100 implements a cell that uses a PCI. The cell also has a reserved range of C-RNTIs that are assigned to UEs 110 served by the cell. If the base station 100 is a C-RAN 100A, the at least one processor performing the method 300 may be located in the baseband controller 104 (in 4G) or DU 105 or CU 103 (in 5G).

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

The method 300 begins at optional step 302 where the at least one processor receives an RRC Re-establishment message from a UE 110. For example, the RRC Re-establishment message may be received after the UE 110 experiences radio link failure while being served by a neighboring cell (most likely implemented by a neighboring base station 100). It should be noted that the present systems and methods may also be implemented using other types of re-establishment messages. The RRC Re-establishment message may be received wirelessly as an RF signal at an RP/RU 106 before being passed to the baseband controller 104 (in 4G) or DU 105 or CU 103 (in 5G).

The method 300 proceeds at step 304 where the at least one processor determines whether a PCI in the RRC Re-establishment message is the same as a PCI used by the cell.

The method 300 proceeds at step 306 where the at least one processor determines whether a C-RNTI in the RRC Re-establishment message is outside the reserved range of C-RNTIs for the cell.

The method 300 proceeds at step 308 where the at least one processor identifies a possible PCI collision for the cell when (1) the PCI in the RRC Re-establishment message is the same as a PCI used by the cell; and (2) the C-RNTI in the RRC Re-establishment message is outside the reserved range of C-RNTIs for the cell. For example, the at least one processor may determine that a possible PCI collision exists for the cell only in response to determining that (1) the PCI in the RRC Re-establishment message is the same as a PCI used by the cell; and (2) the C-RNTI in the RRC Re-establishment message is outside the reserved range of C-RNTIs for the cell.

The method 300 proceeds at optional step 310 where, when a possible PCI collision is identified for the cell, the at least one processor transmits an alarm message to a management system indicating the possible PCI collision for the cell, e.g., via a backhaul network 116A.

In some configurations, the alarm message to the management system 114 (e.g., HeMS) serves as an indication that there could be a possible collision. Once the alarm is alerted to the management system 114 (e.g., HeMS), the operator can take steps to manually reconfigure a new PCI for the cell. Furthermore, if PCI reconfiguration is allowed in the BC 104 (for 4G) or DU 105 or CU 103 (for 5G), then the BC 104, DU 105, or CU 103 can itself reconfigure the PCI (from a provisioned PCI list) after it has alerted the management system 114 (e.g., HeMS) about the possible PCI collision. In some configurations, this process (at the BC 104, DU 105, or CU 103) is automatic.

Optionally, upon receiving an alarm message (e.g., via a backhaul network 116A), the management system 114 may determine whether an actual PCI collision is detected. Determining whether an actual PCI collision is detected can include determining whether the cell (associated with the PCI in the RRC Re-establishment message 406) is on the same operating frequency as the cell implemented by the base station 100 implementing the method 300 (e.g., C-RAN 100A). When both cells are on the same operating frequency, an actual PCI collision is detected (in addition to receiving the alarm message). If both cells are not on the same operating frequency, an actual PCI collision is not detected even if the alarm message is received at the management system 114. In some configurations, the PCI for the cell (implemented by the C-RAN 100A) is only reconfigured when an actual PCI collision is detected at the management system 114.

FIG. 4 is a sequence diagram illustrating PCI collision detection in a communication system 101. The system 101 includes a macro base station 100C, at least one UE 110, a C-RAN 100A, and a management system 114. The C-RAN 100A implements a single cell (e.g., 4G or 5G) that uses a first PCI. The cell (implemented by the C-RAN 100A) also has a first reserved range of C-RNTIs that are assigned to UEs 110 served by the cell.

The C-RAN 100A includes at least one RP (in 4G) or RU (in 5G) and at least one baseband controller 104 (in 4G) or DU 105 or CU 103 (in 5G). For example, when the C-RAN 100A implements a 5G air interface, the single cell implemented by the C-RAN 100A will be managed by a DU 105, which is managed by a 5G CU 103. When the C-RAN 100A implements a 5G air interface, the single cell implemented by the C-RAN 100A will managed by a baseband controller 104.

At the beginning of the sequence, a UE 110 is communicating with a nearby macro base station 100C via an RF link 402, e.g., using an LTE or 5G air interface. The macro base station 100C implements a neighboring cell with that uses a second PCI. The first PCI may be the same or different than the second PCI. Additionally, the neighboring cell (implemented by the macro base station 100C) has a second reserved range of C-RNTIs that are assigned to UEs 110 served by the neighboring cell.

In the sequence, radio link failure 404 occurs between the macro base station 100C and the UE 110. The radio link failure can occur due to interference in a PCI collision scenario. For example, a UE 110 may detect a radio link failure if the Reference Signal Receive Power (RSRP) from the macro base station 100C is too low, if it cannot decode the Physical Downlink Control Channel (PDCCH) transmissions from the macro base station 100C, if it cannot decode the Physical Downlink Shared Channel (PDSCH) transmissions from the macro base station 100C, etc.

In response to detecting a radio link failure, the UE 110 may send an RRC Re-establishment message 406 that is received by the C-RAN 100A. Each RRC Re-establishment message includes a PCI and a cell radio network temporary identifier (C-RNTI). For example, the RRC Re-establishment message may be sent in an RF signal received at one of a plurality of RPs/RUs 106, which processes (e.g., filters, mixes, amplifies, and/or digitizes) the RF signal to extract the RRC Re-establishment message 406, and forwards the RRC Re-establishment message 406 across a front-haul network 116B to a baseband controller 104 (in 4G) or a DU 105 or CU 103 (in 5G). It should be noted that the present systems and methods may also be implemented using other types of re-establishment messages.

In the single-cell configuration of FIG. 4, the baseband controller 104/DU 105/CU 103 checks 408 for a PCI match (between the RRC Re-establishment message and the cell), e.g., whether the PCI in the RRC Re-establishment message is the same as the PCI used by the cell. In the single-cell configuration of FIG. 4, the baseband controller 104/DU 105/CU 103 also determines 410 whether a C-RNTI in the RRC Re-establishment message is outside the reserved range of C-RNTIs for the cell. When (1) the PCI in the RRC Re-establishment message does not match a PCI used by the cell; or (2) the C-RNTI in the RRC Re-establishment message is inside the reserved range of C-RNTIs for the cell, the baseband controller 104/DU 105/CU 103 does not send a possible collision alarm 412 to the management system 114.

In the single-cell configuration of FIG. 4, when (1) the PCI in the RRC Re-establishment message is the same as a PCI used by the cell; and (2) the C-RNTI in the RRC Re-establishment message is outside the reserved range of C-RNTIs for the cell, the baseband controller 104/DU 105/CU 103 sends a possible collision alarm 412 to a management system 114 (e.g., HeMS). It should be noted that an actual PCI collision requires that co-channel neighboring cell(s) managed by different eNBs or gNBs operate(s) with the same PCI, however the baseband controller 104/DU 105/CU 103 may send a possible collision alarm 412 when there is not an actual PCI collision (because the neighbor cell uses the same PCI but is operating on a different frequency).

Upon receiving a possible collision alarm 412 (e.g., via a backhaul network 116A), the management system 114 may optionally determine whether an actual PCI collision is detected. Determining whether an actual PCI collision is detected can include determining whether the cell (associated with the PCI in the RRC Re-establishment message 406) is on the same operating frequency as the cell implemented by the C-RAN 100A. When the cells are on the same operating frequency (and a possible collision alarm 412) is received at the management system 114, an actual PCI collision may be detected.

When the management system 114 detects an actual PCI collision, the management system 114 may manually reconfigure 414 the PCI of the cell implemented by the C-RAN 100A. Manually reconfiguring 414 the PCI may include an operator providing user input at the management system 114 to select a new PCI 416 that is sent to the baseband controller 104/DU 105/CU 103.

Additionally or alternatively, PCI reconfiguration may be performed in the baseband controller 104/DU 105/CU 103. In this configuration, the baseband controller 104/DU 105/CU 103 can determine 418 a new PCI (e.g., from a provisioned list) without receiving it from the management system 114. In some configurations, the baseband controller 104/DU 105/CU 103 may still send a possible collision alarm 412 to the management system 114 even when it determines 418 its own new PCI. In some configurations, the baseband controller 104/DU 105/CU 103 determines 418 its own new PCI only in response to an indication from the management system 114 that an actual PCI collision was detected. In some configurations, the baseband controller 104/DU 105/CU 103 can determine 418 a new PCI automatically (without user input). In some configurations, the baseband controller 104/DU 105/CU 103 may select a new PCI from a previously-determined provisioned list of PCIs.

It should be noted, however, that the techniques described herein for single-cell base stations 100 can be extended to base stations 100 implementing multiple cells. For example, a single baseband controller 104 can manage multiple cells in a 4G system or a single DU 105 can manage multiple cells in a 5G system. For multi-cell scenarios, the cells under the baseband controller 104 (in 4G) or DU 105 (in 5G) can have (1) different PCIs; or (2) the same PCI if different carrier frequencies are used across the multiple cells.

For option 1 (all cells use different PCIs and PCIs are not repeated) multi-cell configurations, a collision is detected when (1) the (PCI, C-RNTI) pair (in the re-establishment message from the UE 110) matches the PCI of any cell (found under a particular DU(s) for 5G or under a particular baseband controller 104 for 4G); and (2) the C-RNTI in the re-establishment message falls outside the C-RNTI range used by the same cell (e.g., because C-RNTI range is specific to a PCI).

In option 2 multi-cell configurations, since PCIs can be re-used in any two cells having different frequencies, a collision is detected when (1) the (PCI, C-RNTI) pair (in the re-establishment message from the UE 110) matches the PCI of any cell (found under a particular DU(s) 105 for 5G or under a particular baseband controller 104 for 4G); and (2) the C-RNTI in the re-establishment message falls outside the combined C-RNTI range used by all cells sharing the same PCI. As an example, assume there are two DUs 105 (in the case of 5G) managed by a 5G CU 103 in the C-RAN 100A, with each DU 105 implementing one cell but operating with different frequencies, or in the case of 4G, two cells operating in different frequencies managed by a single baseband controller 104. In this scenario, a single PCI (e.g., 1) can be assigned to both cells and the C-RNTI range 1:1000 is split into non-overlapping zones of 1:500 and 501:1000, then assigned to each cell, respectively. Then a collision is detected only when a PCI equal to 1 is received in the re-establishment message and the C-RNTI in the re-establishment message is outside of the combined C-RNTI range of 1:1000 (1:500 plus 501:1000).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

Terminology

Brief definitions of terms, abbreviations, and phrases used throughout this application are given below.

The term "determining" and its variants may include calculating, extracting, generating, computing, processing, deriving, modeling, investigating, looking up (e.g., looking up in a table, a database or another data structure), ascertaining and the like. Also, "determining" may also include receiving (e.g., receiving information), accessing (e.g., accessing data in a memory) and the like. Also, "determining" may include resolving, selecting, choosing, establishing and the like.

The phrase "based on" does not mean "based only on," unless expressly specified otherwise. In other words, the phrase "based on" describes both "based only on" and "based at least on". Additionally, the term "and/or" means "and" or "or". For example, "A and/or B" can mean "A", "B", or "A and B". Additionally, "A, B, and/or C" can mean "A alone," "B alone," "C alone," "A and B," "A and C," "B and C" or "A, B, and C."

The terms "connected", "coupled", and "communicatively coupled" and related terms may refer to direct or indirect connections. If the specification states a component or feature "may," "can," "could," or "might" be included or have a characteristic, that particular component or feature is not required to be included or have the characteristic.

The terms "responsive" or "in response to" may indicate that an action is performed completely or partially in response to another action. The term "module" refers to a functional component implemented in software, hardware, or firmware (or any combination thereof) component.

The methods disclosed herein comprise one or more steps or actions for achieving the described method. Unless a specific order of steps or actions is required for proper operation of the method that is being described, the order and/or use of specific steps and/or actions may be modified without departing from the scope of the claims.

In conclusion, the present disclosure provides novel systems, methods, and arrangements for PCI collision detection. While detailed descriptions of one or more configurations of the disclosure have been given above, various alternatives, modifications, and equivalents will be apparent to those skilled in the art without varying from the spirit of the disclosure. For example, while the configurations described above refer to particular features, functions, procedures, components, elements, and/or structures, the scope of this disclosure also includes configurations having different combinations of features, functions, procedures, components, elements, and/or structures, and configurations that do not include all of the described features, functions, procedures, components, elements, and/or structures. Accordingly, the scope of the present disclosure is intended to embrace all such alternatives, modifications, and variations as fall within the scope of the claims, together with all equivalents thereof. Therefore, the above description should not be taken as limiting.

Example Embodiments

Example 1 includes a base station for performing physical cell identifier (PCI) collision detection, comprising: at least one processor configured to: determine whether a PCI in a radio resource control (RRC) re-establishment message is the same as a PCI used by a cell implemented by the base station; determine whether a cell radio network temporary identifier (C-RNTI) in the RRC Re-establishment message is outside a reserved range of C-RNTIs for the cell; and identify a possible PCI collision for the cell when: the PCI in the RRC Re-establishment message is the same as a PCI used by the cell; and the C-RNTI in the RRC Re-establishment message is outside the reserved range of C-RNTIs for the cell.

Example 2 includes the base station of Example 1, wherein the at least one processor is configured to: receive the RRC Re-establishment message from a user equipment (UE).

Example 3 includes the base station of any of Examples 1-2, wherein the at least one processor is configured to: when a possible PCI collision is identified for the cell, the at least one processor transmits an alarm message to a management system indicating the possible PCI collision for the cell.

Example 4 includes the base station of Example 3, wherein the management system determines whether an actual PCI collision is detected in response to receiving the alarm message.

Example 5 includes the base station of any of Examples 3-4, wherein the actual PCI collision is detected when the cell uses a same operating frequency as a neighboring cell associated with the PCI in the RRC Re-establishment message.

Example 6 includes the base station of any of Examples 3-5, wherein the PCI for the cell is reconfigured in response to determining that an actual PCI collision is detected.

Example 7 includes the base station of any of Examples 3-6, wherein the PCI for the cell is reconfigured by: manual input from an operator at the management system; or the at least one processor in the base station selecting a new PCI from a provisioned PCI list.

Example 8 includes the base station of any of Examples 3-7, wherein the PCI remains in use by the cell when an actual PCI collision is not detected by the management system in response to receiving the alarm message.

Example 9 includes the base station of any of Examples 1-8, wherein the base station is implemented using a cloud radio access network (C-RAN), comprising: at least one radio point (RP), each being configured to exchange radio frequency (RF) signals with at least one user equipment (UE); and a baseband controller communicatively coupled to the at least one RP via a front-haul ETHERNET network.

Example 10 includes the base station of Example 9, wherein the at least one processor is implemented in the baseband controller.

Example 11 includes the base station of any of Examples 1-10, wherein the base station is implemented using a cloud radio access network (C-RAN), comprising: a plurality of remote units (RUs), each being configured to exchange radio frequency (RF) signals with at least one user equipment (UE); a central unit communicatively coupled to the plurality of RUs via a fronthaul ETHERNET interface, wherein the central unit is a Distributed Unit (DU) or a Central Unit (CU) configured to operate in a 3GPP Fifth Generation communication system.

Example 12 includes the base station of Example 11, wherein the at least one processor is implemented in the central unit.

Example 13 includes the base station of any of Examples 1-12, wherein the base station is implemented using a macro base station.

Example 14 includes a method for physical cell identifier (PCI) collision detection in a base station, the method comprising: determining whether a PCI in a radio resource control (RRC) re-establishment message is the same as a PCI used by a cell implemented by the base station; determining whether a cell radio network temporary identifier (C-RNTI) in the RRC Re-establishment message is outside a reserved range of C-RNTIs for the cell; and identifying a possible PCI collision for the cell when: the PCI in the RRC Re-establishment message is the same as a PCI used by the cell; and the C-RNTI in the RRC Re-establishment message is outside the reserved range of C-RNTIs for the cell.

Example 15 includes the method of Example 14, further comprising: receiving the RRC Re-establishment message from a user equipment (UE).

Example 16 includes the method of any of Examples 14-15, further comprising: when a possible PCI collision is identified for the cell, transmitting an alarm message to a management system indicating the possible PCI collision for the cell.

Example 17 includes the method of Example 16, further comprising determining, at the management system, whether an actual PCI collision is detected in response to receiving the alarm message.

Example 18 includes the method of any of Examples 16-17, further comprising detecting the actual PCI collision when the cell uses a same operating frequency as a neighboring cell associated with the PCI in the RRC Re-establishment message.

Example 19 includes the method of any of Examples 16-18, further comprising reconfiguring the PCI for the cell in response to determining that an actual PCI collision is detected.

Example 20 includes the method of any of Examples 16-19, wherein the PCI for the cell is reconfigured by: manual input from an operator at the management system; or the base station selecting a new PCI from a provisioned PCI list.

Example 21 includes the method of any of Examples 16-20, wherein the PCI remains in use by the cell when an actual PCI collision is not detected by the management system in response to receiving the alarm message.

Example 22 includes the method of any of Examples 14-21, wherein the base station is implemented using a cloud radio access network (C-RAN), comprising: at least one radio point (RP), each being configured to exchange radio frequency (RF) signals with at least one user equipment (UE); and a baseband controller communicatively coupled to the at least one RP via a front-haul ETHERNET network.

Example 23 includes the method of Example 22, wherein the method is performed by the baseband controller.

Example 24 includes the method of any of Examples 14-23, wherein the base station is implemented using a cloud radio access network (C-RAN), comprising: a plurality of remote units (RUs), each being configured to exchange radio frequency (RF) signals with at least one user equipment (UE); a central unit communicatively coupled to the plurality of RUs via a fronthaul ETHERNET interface, wherein the central unit is a Distributed Unit (DU) or a Central Unit (CU) configured to operate in a 3GPP Fifth Generation communication system.

Example 25 includes the method of Example 24, wherein the method is performed by the central unit.

Example 26 includes the method of any of Examples 14-25, wherein the base station is implemented using a macro base station.

The invention claimed is:

1. A base station for performing physical cell identifier (PCI) collision detection, comprising:
at least one processor configured to:
determine whether a PCI in a radio resource control (RRC) Re-establishment message is the same as a PCI used by a cell implemented by the base station;
determine whether a cell radio network temporary identifier (C-RNTI) in the RRC Re-establishment message is outside a reserved range of C-RNTIs for the cell; and
identify a possible PCI collision for the cell when:
the PCI in the RRC Re-establishment message is the same as the PCI used by the cell; and
the C-RNTI in the RRC Re-establishment message is outside the reserved range of C-RNTIs for the cell; and
when the possible PCI collision is identified for the cell, transmit an alarm message to a management system indicating the possible PCI collision for the cell.

2. The base station of claim 1, wherein the at least one processor is configured to:
receive the RRC Re-establishment message from a user equipment (UE).

3. The base station of claim 1, wherein the management system determines whether an actual PCI collision is detected in response to receiving the alarm message.

4. The base station of claim 1, wherein an actual PCI collision is detected when the cell uses a same operating frequency as a neighboring cell associated with the PCI in the RRC Re-establishment message.

5. The base station of claim 1, wherein the PCI for the cell is reconfigured in response to determining that an actual PCI collision is detected.

6. The base station of claim 1, wherein the PCI for the cell is reconfigured by:
manual input from an operator at the management system; or
the at least one processor in the base station selecting a new PCI from a provisioned PCI list.

7. The base station of claim 1, wherein the PCI remains in use by the cell when an actual PCI collision is not detected by the management system in response to receiving the alarm message.

8. The base station of claim 1, wherein the base station is implemented using a cloud radio access network (C-RAN), comprising:
at least one radio point (RP), each being configured to exchange radio frequency (RF) signals with at least one user equipment (UE); and
a baseband controller communicatively coupled to the at least one RP via a front-haul ETHERNET network.

9. The base station of claim 8, wherein the at least one processor is implemented in the baseband controller.

10. The base station of claim 1, wherein the base station is implemented using a cloud radio access network (C-RAN), comprising:
a plurality of remote units (RUs), each being configured to exchange radio frequency (RF) signals with at least one user equipment (UE); and
a centralized unit communicatively coupled to the plurality of RUs via a fronthaul ETHERNET interface, wherein the centralized unit is a Distributed Unit (DU) or a Central Unit (CU) configured to operate in a 3GPP Fifth Generation communication system.

11. The base station of claim 10, wherein the at least one processor is implemented in the centralized unit.

12. The base station of claim 1, wherein the base station is implemented using a macro base station.

13. A method for physical cell identifier (PCI) collision detection in a base station, the method comprising:
    determining whether a PCI in a radio resource control (RRC) Re-establishment message is the same as a PCI used by a cell implemented by the base station;
    determining whether a cell radio network temporary identifier (C-RNTI) in the RRC Re-establishment message is outside a reserved range of C-RNTIs for the cell; and
    identifying a possible PCI collision for the cell when:
        the PCI in the RRC Re-establishment message is the same as a PCI used by the cell; and
        the C-RNTI in the RRC Re-establishment message is outside the reserved range of C-RNTIs for the cell; and
    when the possible PCI collision is identified for the cell, transmitting an alarm message to a management system indicating the possible PCI collision for the cell.

14. The method of claim 13, further comprising:
    receiving the RRC Re-establishment message from a user equipment (UE).

15. The method of claim 13, further comprising determining, at the management system, whether an actual PCI collision is detected in response to receiving the alarm message.

16. The method of claim 13, further comprising detecting an actual PCI collision when the cell uses a same operating frequency as a neighboring cell associated with the PCI in the RRC Re-establishment message.

17. The method of claim 13, further comprising reconfiguring the PCI for the cell in response to determining that an actual PCI collision is detected.

18. The method of claim 13, wherein the PCI for the cell is reconfigured by:
    manual input from an operator at the management system; or
    the base station selecting a new PCI from a provisioned PCI list.

19. The method of claim 13, wherein the PCI remains in use by the cell when an actual PCI collision is not detected by the management system in response to receiving the alarm message.

20. The method of claim 13, wherein the base station is implemented using a cloud radio access network (C-RAN), comprising:
    at least one radio point (RP), each being configured to exchange radio frequency (RF) signals with at least one user equipment (UE); and
    a baseband controller communicatively coupled to the at least one RP via a front-haul ETHERNET network.

21. The method of claim 20, wherein the method is performed by the baseband controller.

22. The method of claim 13, wherein the base station is implemented using a cloud radio access network (C-RAN), comprising:
    a plurality of remote units (RUs), each being configured to exchange radio frequency (RF) signals with at least one user equipment (UE); and
    a centralized unit communicatively coupled to the plurality of RUs via a fronthaul ETHERNET interface, wherein the centralized unit is a Distributed Unit (DU) or a Central Unit (CU) configured to operate in a 3GPP Fifth Generation communication system.

23. The method of claim 22, wherein the method is performed by the centralized unit.

24. The method of claim 13, wherein the base station is implemented using a macro base station.

* * * * *